June 14, 1949.
C. E. ADAMS
2,473,407
DISK SUPPORTING JIG WHILE TREATING
THE EDGE OF THE DISK
Filed May 2, 1947
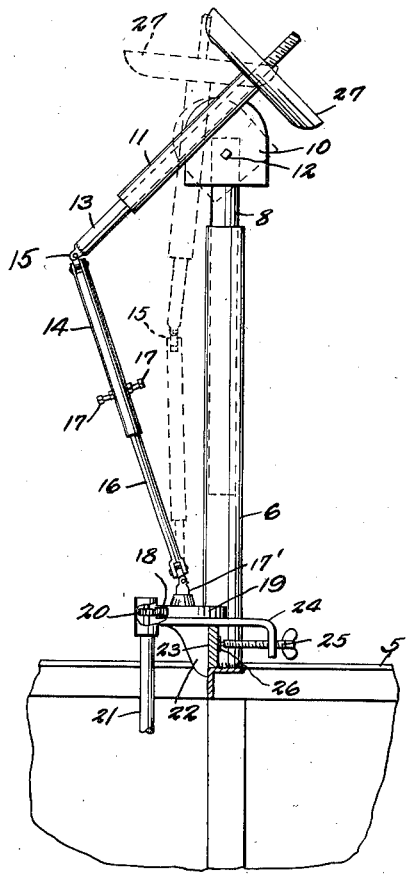
Fig.1.
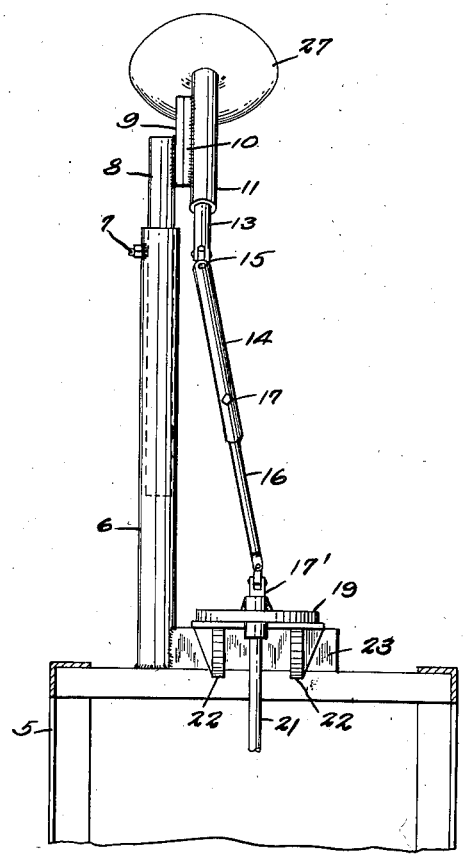
Fig.2.
Fig.3.
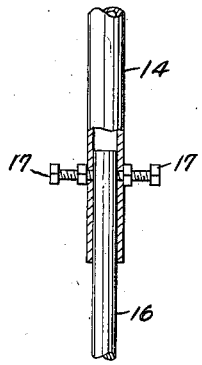
Fig.4.
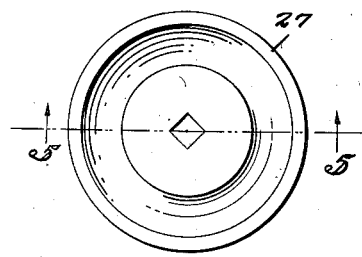
Fig.5.
C. E. Adams
INVENTOR
BY C. A. Snow & Co.
ATTORNEYS.

Patented June 14, 1949

2,473,407

UNITED STATES PATENT OFFICE 2,473,407

DISK SUPPORTING JIG WHILE TREATING THE EDGE OF THE DISK

Clifford E. Adams, Wakita, Okla.

Application May 2, 1947, Serial No. 745,669

1 Claim. (Cl. 91—60)

This invention relates to jigs, the primary object of the invention being to provide a jig which is so constructed that it will support a disc in in such a way that the cutting edge of the disc may be treated to provide a self-sharpening disc in accordance with the structure set forth in my co-pending application, filed August 29, 1946, Serial Number 693,727.

An important object of the invention is to provide a jig which may be adjusted to various angular positions to permit the treatment to be carried out with facility, the jig being constructed to slowly rotate the disc under treatment.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 1 is an elevational view of the jig mounted on a support for use in treating ground-engaging implements such as discs.

Figure 2 is a rear elevational view thereof.

Figure 3 is a fragmental view illustrating the telescoping feature of the adjusting rod of the device.

Figure 4 is a front elevational view of the disc holder, forming a part of the jig.

Figure 5 is a sectional view through the disc holder, taken on line 5—5 of Figure 4.

Referring to the drawing in detail, the device comprises a table indicated generally by the reference character 5, the table being preferably constructed of angle bar material secured together at the ends thereof, as by welding.

Rising from the table 5 is the main hollow post 6 which is formed with a threaded opening to accommodate the set screw 7 which engages the telescoping section 8 of the main post, to hold the telescoping section 8 in its positions of adjustment, within the main hollow post 6.

Welded to the upper end of the post 8, is a plate 9, which plate 9 cooperates with the plate 10 which is welded to the tubular bearing 11 in securing the tubular bearing 11 in various positions of adjustment with respect to the main post 6. The plates 9 and 10 are provided with aligning openings for the reception of the adjusting bolt 12, whereby the plates may be secured in various positions of adjustment with respect to each other.

Extending through the tubular bearing 11, is the shaft 13 which has connection with the tubular shaft 14 through the medium of the universal connection 15, the tubular shaft 14 accommodating the telescoping shaft 16, which is held in its adjusted positions with respect to the tubular shaft 14, by means of the set screw 17.

The lower end of the shaft 16 connects with the power shaft 17' that is operated by the reduction gearing 18 mounted within the reduction gearing housing 19. The reduction gearing is operated by the gear 20 carried at one end of the shaft 21 that in turn is operated from a suitable power device, not shown.

The gear housing 19 is provided with spaced arms 22 that engage the upstanding plate 23, that is secured to the table 5 and welded at the lower end of the main hollow post 6, as clearly shown by Figure 2 of the drawing.

A clamp arm 24 is welded to the bottom of the gear housing 19, and extends in spaced relation with the plate 23, there being provided a set screw 25 operating through a threaded opening in the clamp arm 24, the inner end of the set screw carrying the head 26, so that the reduction gear housing may be securely fastened to the plate 23.

On the outer end of the tubular bearing 11, and secured to the squared end of the shaft 13. is the disc holder 27, the disc positioned on the holder, being a disc which is being treated by depositing a certain wear-resisting metal on one surface of the cutting edge of the disc, so that when the disc is moved over the ground surface, the usual metal of which the disc is constructed, will wear away, leaving the wear-resisting material to engage the ground surface and accomplish the cutting action of the disc.

It will, of course, be understood that the disc holder and disc supported thereon, will rotate slowly with the shaft 13 so that a person working on the disc to treat the disc, will merely be required to hold the tool used in depositing the wear-resisting metal on the disc, in position, the rotary movement of the disc holder and disc, changing the surface which is brought before the tool.

It might be further stated that by adjusting the sections of the shafts, the angle of operation of the disc may be varied to meet requirements of use.

What is claimed is:

A jig of the class described, comprising a main hollow vertical post, including a telescoping section adjustably secured within the hollow post, a plate secured to the telescoping section at the upper end thereof, the side faces of the plate being parallel with the side of the telescoping section, a tubular bearing, a plate secured to the side of the tubular bearing and resting against the first-mentioned plate, a bolt extending through the plates adjustably securing the tubular bearing to the telescoping section of the main post, a shaft operating within the tubular bearing, a disc holder secured to one end of the shaft to rotate therewith and on which a disc to be treated is held, a power shaft embodying telescoping sections, means for securing the telescoping sections of the shaft in their positions of adjustment with respect to each other, a universal connection between the power shaft and first mentioned shaft for rotating the first mentioned shaft, and reduction gearing for operating the shafts.

CLIFFORD E. ADAMS.

REFERENCES CITED

The following references are of record in the file of this patent:

UNITED STATES PATENTS

| Number | Name | Date |
|---|---|---|
| 681,440 | Clizbe | Aug. 27, 1901 |
| 716,788 | Thomson | Dec. 23, 1902 |
| 1,327,973 | Allen | Jan. 13, 1920 |
| 1,401,563 | Smith | Dec. 27, 1921 |
| 1,611,756 | Leigh | Dec. 21, 1926 |